United States Patent
Kim et al.

(10) Patent No.: US 6,790,801 B2
(45) Date of Patent: Sep. 14, 2004

(54) NONREDUCIBLE DIELECTRIC CERAMIC COMPOSITION

(75) Inventors: Young Min Kim, Kyungki-do (KR); Jong Hee Kim, Seoul (KR); Dong Sook Shin, Seoul (KR); Young Tae Moon, Kyungki-do (KR)

(73) Assignee: Samsung Electro-Mechanics Co., Ltd. (KR)

( * ) Notice: Subject to any disclaimer, the term of this patent is extended or adjusted under 35 U.S.C. 154(b) by 0 days.

(21) Appl. No.: 10/326,971

(22) Filed: Dec. 24, 2002

(65) Prior Publication Data

US 2003/0125191 A1 Jul. 3, 2003

(30) Foreign Application Priority Data

Dec. 27, 2001 (KR) ........................................ 2001-86346

(51) Int. Cl.[7] ........................ C04B 35/49; C04B 35/465
(52) U.S. Cl. ..................... 501/136; 501/135; 361/321.4
(58) Field of Search ................................ 501/135, 136, 501/137, 138, 139; 361/321.4, 321.5

(56) References Cited

U.S. PATENT DOCUMENTS

| | | | | |
|---|---|---|---|---|
| 4,859,641 A | * | 8/1989 | Fujino et al. | ................ 501/136 |
| 6,329,311 B1 | * | 12/2001 | Fujii et al. | .................. 501/136 |
| 6,627,570 B2 | * | 9/2003 | Fukui et al. | ................ 501/136 |
| 6,645,895 B2 | * | 11/2003 | Sato et al. | .................. 501/136 |
| 6,656,863 B2 | * | 12/2003 | Fukui et al. | ................ 501/136 |

FOREIGN PATENT DOCUMENTS

| | | | |
|---|---|---|---|
| EP | 1036778 | * | 9/2000 |
| JP | 63126117 | * | 5/1988 |
| JP | 63289707 | * | 11/1988 |
| JP | 63-289709 | | 11/1988 |
| JP | 63289710 | * | 11/1988 |
| JP | 10-335169 | | 12/1998 |

* cited by examiner

*Primary Examiner*—Karl Group
(74) *Attorney, Agent, or Firm*—Lowe Hauptman Gilman & Berner, LLP

(57) ABSTRACT

Disclosed is a nonreducible dielectric composition. Provided is a highly reliable TC based dielectric composition prepared by adding a sintering additive having excellent qualities to a conventional $(Ca_{1-x}Sr_x)_m(Zr_{1-y}Ti_y)O_3$ based dielectric composition, so that it can be sintered under a reducing atmosphere to be used in formation of a nickel electrode, can be sintered at a low temperature of less than 1,250° C., and has a small dielectric loss and a high resistivity. The composition of the present invention includes a nonreducible dielectric composition comprising a main component expressed by the general formula, $(Ca_{1-x}Sr_x)_m(Zr_{1-y}Ti_y)O_3$, which has the ranges of $0 \leq x \leq 1$, $0.09 \leq y \leq 0.35$, and $0.7 \leq m \leq 1.05$; and 0.5–10 wt % of a minor component expressed by the general formula, $aMnO\text{-}bSiO_2\text{-}dR_1O\text{-}eR_2O_2$ ($a+b+d+e=100$, $R_1$ is at least one element selected from the group consisting of Mg, Ca, Sr and Ba, and $R_2$ is at least one element of Zr and Ti), which has the ranges of $20 \leq a \leq 60$, $10 \leq b \leq 65$, and $0 \leq (d+e) \leq 65$.

2 Claims, No Drawings

NONREDUCIBLE DIELECTRIC CERAMIC COMPOSITION

BACKGROUND OF THE INVENTION

1. Field of the Invention

The present invention relates to a nonreducible dielectric composition to be applied to a laminated ceramic capacitor for temperature compensation, and the like, and more particularly, to a nonreducible dielectric composition having a high insulation resistance and a small dielectric loss, which can be sintered under a reducing atmosphere using an internal electrode containing nickel (Ni).

2. Description of the Related Art

Demand for laminated ceramic capacitors is increasing yearly due to digitalization, miniaturization and high-functionalization of electronic products, and they have been used in a variety of electronic devices such as televisions, computers, video cameras, cellular phones and the like. In recent years, there has been an increased need for a laminated ceramic capacitor having excellent characteristics, that is, a high insulation resistance, a small dielectric loss, and a reduced variation in capacitance upon a variation in temperature.

A conventional laminated ceramic capacitor was manufactured by sintering a high-priced noble metal such as palladium (Pd) or silver-palladium (Ag—Pd) alloy including palladium as an internal electrode, and a BaO—$Nd_2O_3$—$TiO_2$— or $MgTiO_3$—$CaTiO_3$-based dielectric composition under an atmosphere of 1,100–1,350° C. However, there have been problems in that due to oxygen vacancies formed when sintered under a reducing atmosphere, the composition exhibits a lowered insulation resistance and a degraded reliability, and thus Ni cannot be employed as an internal electrode.

In order to use nickel as an internal electrode, such a composition must be able to be sintered under a reducing atmosphere. Known up until now has been a CSZT based composition disclosed in Japanese Patent Laid-Open Publication No. 10-335169. The composition consists of a main component expressed by the general formula, $(Ca_{1-x}Sr_x)_m(Zr_{1-y}Ti_y)O_3$, which meets the conditions: $0 \leq x \leq 1$, $0 \leq y \leq 0.1$ and $0.75 \leq m \leq 1.04$; and a minor component of BCG: 0.5–15 mol %, MnO: 0.2–5 mol %, $Al_2O_3$: 0.1–10 mol % (on the basis of the total moles of the main component) and a rare earth element.

The composition disclosed in the above publication has advantages of nonreducibiliy and a reduced variation in capacitance upon a variation in temperature. Furthermore, the composition overcomes a large dielectric loss at high temperature-low frequency condition encountered in lithium glass (Li-glass) based composition. Also, the composition is characterized in that uniform and small grain size can be obtained.

In spite of these advantages, in the above composition, the sintering temperature of dielectric is as high as 1,300° C., and the sintering initiating temperature of dielectric is higher than that of Ni used for an internal electrode. As a result, there is a problem in that cracks, defects or the like are caused by mismatching between the internal electrode and ceramic. This is because the metal of the electrode exhibits a shrinkage rate higher than that of ceramic during the sintering process.

Meanwhile, Japanese Patent Laid-Open Publication No. 63-289709 discloses a composition consisting of a main component, $(Ca_xSr_{1-x})_m(Zr_yTi_{1-y})O_3$ ($0.3 \leq x \leq 0.5$, $0.92 \leq y \leq 0.98$, and $0.95 \leq m \leq 1.08$) and a minor component, $MnO_2$(0.01–4.0 wt %) and $SiO_2$(2.0–8.0 wt %), the composition being sinterable under a reducing atmosphere. The dielectric constant of Ca/Sr in the composition is relatively high, below 1.

Nevertheless, the above composition still has a problem in that a dielectric loss at high temperature-low frequency condition is large. Furthermore, the composition involves generation of defects by mismatching between electrode metal and ceramic during a sintering process, because sintering temperature of ceramic is high, up to 1,300° C.

SUMMARY OF THE INVENTION

Therefore, the present invention has been made in view of the above problems, and it is an object of the present invention to provide a highly reliable dielectric composition prepared by adding a sintering additive having excellent qualities to a conventional $(Ca_{1-x}Sr_x)_m(Zr_{1-y}Ti_y)O_3$ based dielectric composition, so that it can be sintered under a reducing atmosphere to be used in formation of a nickel electrode, can be sintered at low temperature of less than 1,250° C., and has a small dielectric loss and a high resistivity.

Another abject of the present invention is to provide a dielectric composition meeting TC characteristics in accordance with the EIA (Electric Industry Association) Standard.

In accordance with one aspect of the present invention, there is provided a nonreducible dielectric composition comprising a main component expressed by the general formula, $(Ca_{1-x}Sr_x)_m(Zr_{1-y}Ti_y)O_3$, which has the ranges of $0 \leq x \leq 1$, $0.09 \leq y \leq 0.35$, and $0.7 \leq m \leq 1.05$; and 0.5–10 wt % of a minor component expressed by the general formula, $aMnO$-$bSiO_2$-$cAl_2O_3$ (a+b+c=100), which has the ranges of $20 \leq a \leq 60$, $10 \leq b \leq 65$, and $1 \leq c \leq 10$.

In accordance with another aspect of the present invention, there is provided a nonreducible dielectric composition comprising a main component expressed by the general formula, $(Ca_{1-x}Sr_x)_m(Zr_{1-y}Ti_y)O_3$, which has the ranges of $0 \leq x \leq 1$, $0.09 \leq y \leq 0.35$, and $0.7 \leq m \leq 1.05$; and 0.5–10 wt % of a minor component expressed by the general formula, $bSiO_2$-$cAl_2O_3$-$dR_1O$ (b+c+d=100, $R_1$ is at least one element selected from the group consisting of Mg, Ca, Sr and Ba), which has the ranges of $10 \leq b \leq 65$, $0 < c \leq 10$ and $0 \leq d \leq 50$.

In accordance with still another aspect of the present invention, there is provided a nonreducible dielectric composition comprising a main component expressed by the general formula, $(Ca_{1-x}Sr_x)_m(Zr_{1-y}Ti_y)O_3$ which has the ranges of $0 \leq x \leq 1$, $0.09 \leq y \leq 0.35$, and $0.7 \leq m \leq 1.05$; and 0.5–10 wt % of a minor component expressed by the general formula, $aMnO$-$bSiO_2$-$dR_1O$-$eR_2O_2$ (a+b+d+e=100, $R_1$ is one or two elements of Mg, Ca, Sr and Ba, and $R_2$ is at least one of Zr and Ti), which has the ranges of $20 \leq a \leq 60$, $10 \leq b \leq 65$, and $0 < (d+e) \leq 65$.

Finally, in accordance with yet another aspect of the present invention, there is provided a nonreducible dielectric composition comprising a main component expressed by the general formula, $(Ca_{1-x}Sr_x)_m(Zr_{1-y}Ti_y)O_3$, which has the ranges of $0 \leq x \leq 1$, $0.09 \leq y \leq 0.35$, and $0.7 \leq m \leq 1.05$; and 0.5–10 wt % of a minor component expressed by the general formula, $bSiO_2\text{-}dR_1O\text{-}eR_2O_2$ ($b+d+e=100$, $R_1$ is at least one element selected from the group consisting of Mg, Ca, Sr and Ba, and $R_2$ is one of Zr and Ti), which has the ranges of $10 \leq b \leq 65$, $10 \leq d \leq 20$, and $10 \leq e \leq 60$.

DESCRIPTION OF THE PREFERRED EMBODIMENTS

Hereinafter, the nonreducible dielectric composition in accordance with the present invention will be described in detail.

The present invention relates to a nonreducible dielectric composition in which its main component is expressed by the general formula, $(Ca_{1-x}Sr_x)_m(Zr_{1-y}Ti_y)O_3$. In accordance with the present invention, it is required that x, y and m meet the conditions of $0 \leq x \leq 1$, $0.09 \leq y \leq 0.35$, and $0.7 \leq m \leq 1.05$, using conventionally available materials.

The subscript x in the main component is within the range of $0 \leq x \leq 1$. That is, the composition may contain any mixture of Ca and Sr, or only one element of both of them. The higher the value of x, i.e., the higher the proportion of Sr, the larger the mean grain size of crystals becomes and the more the dielectric constant increases. In order to obtain a smaller sintered grain size, preferred range of x is less than 0.5.

The subscript y in the main component is within the range of $0.09 \leq y \leq 0.35$. A temperature coefficient of capacitance and a dielectric constant depend on the y value. The higher the value of y, the more negative the temperature coefficient of capacitance becomes and the more the dielectric constant increases. In order to obtain a TC based dielectric composition in accordance with the present invention, the composition range of y is limited to $0.09 \leq y \leq 0.35$. As a result, a composition can be obtained that meets the requirements of $-150 \pm 60$ ppm/° C.(PH characteristics), $-220 \pm 60$ ppm/° C.(RH), $-470 \pm 60$ ppm/° C.(TH), $-750 \pm 120$ ppm/° C.(UJ) for a temperature coefficient.

The subscript m of the main component is within the range of $0.7 \leq m \leq 1.05$. Undesirably, however, if m is less than 0.7, the dielectric loss increases, and if m exceeds 1.05, sintering temperature rises.

A minor component is also included in the dielectric composition of present invention. The minor component is added as a sintering additive selected from sintering additives of four types. In accordance with the present invention, the added amount of sintering additive is preferably 0.5–10 wt % based on the total amount of the main component. Where the amount of the sintering additive is less than 0.5 wt %, sintering property becomes poor. Where the amount exceeds 10 wt %, intrinsic qualities of dielectric become poor, for example, a low dielectric constant, an increased dielectric loss, etc.

The first type sintering additive is a minor component expressed by the general formula, $aMnO_2\text{-}bSiO_2\text{-}cAl_2O_3$ ($a+b+c=100$), which has the ranges of $20 \leq a \leq 60$, $10 \leq b \leq 65$, and $1 \leq c \leq 10$.

The $MnO_2$ serves as an acceptor and thus absorbs free electrons in oxygen vacancies made when the main component is sintered under a reducing atmosphere, which in turn make it possible to sinter under a reducing atmosphere. Undesirably, however, if the $MnO_2$ content is less than 20 mol %, the value of resistivity becomes lower, and if the $MnO_2$ content exceeds 60 mol %, solid solution is not good enough for the $MnO_2$ to be deposited, and sintering property becomes poor.

Content of $SiO_2$ is defined as 10–65 mol %. If the content is less than 10 mol %, it has no effect, and if the content exceeds 65 mol %, sintering property is prone to worsen due to viscosity.

The $Al_2O_3$ is added to improve water resistance and mechanical strength. Since $Al_2O_3$ is deposited without being dissolved when added in excess, it is preferable for $Al_2O_3$ to be contained in an amount of less than 10 mol % in the minor component.

The second type sintering additive is a minor component expressed by the general formula, $bSiO_2\text{-}cAl_2O_3\text{-}dR_1O$ ($b+c+d=100$, $R_1$ is at least one element chosen from Mg, Ca, Sr and Ba), which has the ranges of $10 \leq b \leq 65$, $0 < c \leq 10$ and $0 \leq d \leq 50$.

The third type sintering additive is a minor component expressed by the general formula, $aMnO\text{-}bSiO_2\text{-}dR_1O\text{-}eR_2O_2$ ($a+b+d+e=100$, $R_1$ is at least one element of Mg, Ca, Sr and Ba, and $R_2$ is at least one element chosen from Zr and Ti), which has the ranges of $20 \leq a \leq 60$, $10 \leq b \leq 65$, $0 < (d+e) \leq 65$.

Finally, the fourth type sintering additive proposed in the present invention is a minor component expressed by the general formula, $bSiO_2\text{-}dR_1O\text{-}eR_2O_2$ ($b+d+e=100$, $R_1$ is at least one element selected from the group consisting of Mg, Ca, Sr and Ba, and $R_2$ is one of element Zr and Ti), which has ranges of $10 \leq b \leq 65$, $10 \leq d \leq 20$ and $10 \leq e \leq 60$.

Metal oxides expressed as $R_1O$ or $R_2O_2$ may be contained as a part of the minor component to improve properties of the minor component itself such as water resistance, acid resistance, etc. As a metal ion to be used for this purpose, $R_1$ is a least one element selected from the group consisting of Ba, Ca, Sr and Mg, and $R_2$ is a least one element of Ti and Zr. These metal oxides modify the surfaces of glasses or bind to non-bridging oxygen ions, thereby making it possible to improve chemical stability of the minor component. These metal oxides are added to the extent that the sintering property is not lowered and their effects are accomplished, without departing from the ranges of the minor component having a composition of the above sintering additives.

EXAMPLE

Hereinafter, the present invention will be illustrated in detail by way of the non-limiting examples.

In order to prepare $(Ca_{1-x}Sr_x)_m(Zr_{1-y}Ti_y)O_3$ based nonreducible dielectric composition in the proportions shown in table 1 below, $CaCO_3$, $SrCO_3$, $TiO_2$ and $ZrO_2$ were weighed, and the weighed materials were mixed, then sintered at a temperature of 1,100–1,250° C. for several hours and then pulverized to form a main component.

As for a minor component, $MnO_2$, $SiO_2$, $CaCO_3$, $MgCO_3$, $SrCO_3$, $BaCO_3$, $Al_2O_3$, $ZrO_2$ and $TiO_2$ were weighed in the proportions shown in table 2 below, mixed, completely dissolved in a platinum crucible at 1,500° C. and quenched quickly to room temperature to form the component as a glass phase, or alternatively, weighed, mixed, sintered at a temperature of 1,200° C. for several hours, and then pulverized to form the component.

The main component and the minor component were weighed in the proportions shown table 1, PVB or acrylic binder or solvent, plasticizer, etc. were added thereto, and then dispersed with a high-energy mill to form a slurry, which was then transformed into a sheet with a thickness of 10 μm.

An electrode paste using a nickel or a nickel-contained non-metal electrode material as an internal electrode was printed on the transformed sheet and then laminated. The resultant laminate was cut to form green chips, the green chips were baked out in air at 200–300° C. for 12–48 hours, then in nitrogen ($N_2$) atmosphere at 200–600° C. for 0.5–48 hours.

After completion of the baking-out, for avoiding oxydation of an internal electrode, the green chips were sintered under a reducing atmosphere (a partial pressure of oxygen $10^{-8}$–$10^{-15}$ atm) at a sintering temperature of 1,250° C. or below, and then heated under $10^{-5}$–$10^{-8}$ atm of a partial pressure of oxygen in a temperature range of 1,100–800° C. to obtain a sintered body.

The sintered body thus obtained was subjected to polishing. Subsequently, an external electrode was formed of a metal such as Cu. The external electrode was sintered at approximately 700–900° C. and then was plated for avoiding oxydation and soldering.

TABLE 1

| Specimen | X | 1-x | Y | 1-y | m | Glass frit (GF) Type | Added Amount of GF |
|---|---|---|---|---|---|---|---|
| Exam. 1 | 0.0 | 1.0 | 0.21 | 0.79 | 1.0 | F | 2.5 |
| Exam. 2 | 0.0 | 1.0 | 0.23 | 0.77 | 1.0 | H | 2.5 |
| Exam. 3 | 0.0 | 1.0 | 0.23 | 0.77 | 1.0 | I | 2.5 |
| Exam. 4 | 0.5 | 0.5 | 0.29 | 0.71 | 1.0 | I | 2.5 |
| Exam. 5 | 0.7 | 0.3 | 0.29 | 0.71 | 1.0 | H | 2.5 |
| Exam. 6 | 0.74 | 0.26 | 0.15 | 0.85 | 1.0 | I | 2.5 |
| Exam. 7 | 0.77 | 0.23 | 0.24 | 0.76 | 1.0 | A | 2.5 |
| Exam. 8 | 0.78 | 0.22 | 0.28 | 0.72 | 1.0 | D | 2.5 |
| Exam. 9 | 1 | 0.0 | 0.12 | 0.88 | 1.0 | C | 2.5 |
| Exam. 10 | 1 | 0.0 | 0.21 | 0.79 | 1.0 | D | 2.5 |
| Exam. 11 | 1 | 0.0 | 0.3 | 0.70 | 1.0 | C | 2.5 |
| Comparative Exam. 1 | 0.0 | 1.0 | 0.0 | 1.0 | 1.0 | B | 2.5 |
| Comparative Exam. 2 | 0.0 | 1.0 | 1.0 | 0.0 | 1.0 | A | 2.5 |
| Comparative Exam. 3 | 0.7 | 0.3 | 0.03 | 0.97 | 1.0 | G | 2.5 |
| Comparative Exam. 4 | 1 | 0.0 | 1.0 | 0.0 | 1.0 | E | 2.5 |

TABLE 2

| Specimen | $MnO_2$ | $SiO_2$ | $Al_2O_3$ | $R_1$ | | | | $R_2$ | |
|---|---|---|---|---|---|---|---|---|---|
| | | | | BaO | MgO | CaO | SrO | $TiO_2$ | $ZrO_2$ |
| A | 35.02 | 56.20 | 8.78 | | | | | | |
| B | 50.00 | 38.85 | | | | | | 11.15 | |
| C | | 50.00 | 8.29 | | 8.43 | 33.27 | | | |
| D | 22.22 | 18.52 | | | | 18.52 | | 40.74 | |
| E | | 63.12 | | | | 18.44 | | 18.45 | |
| F | 29.13 | 49.74 | 6.86 | | 3.45 | 10.82 | | | |
| G* | | 50.00 | | 25.00 | | | 25.00 | | |
| H | 55.24 | 40.19 | | | | | | | 4.57 |
| I | | 42.73 | 9.02 | | 18.92 | 29.33 | | | |

Specimen indicated with an asterisk(*) is that having a sintering additive condition out of the present invention.

As mentioned above, each specimen prepared in the composition proportions shown in table 1 and table 2, respectively, was tested to measure its characteristics.

The evaluated items were a dielectric constant, a temperature coefficient of capacitance, tanδ and resistivity, which were practiced as the following manner. The dielectric constant was measured on the basis of capacitance at 1 MHz, 25° C., 1 Vrms(AC voltage: 1V) and tanδ (which indicates dielectric loss) was also measured at 1 MHz, 25° C., 1 Vrms. The temperature coefficient of capacitance (TCC) was determined over −55° C./125° C. on the basis of capacitance at 25° C. and was given by the equation:

$$TCC(ppm/°\text{C.}) = [(C_T - C_{25}°\text{C.})/C_{25}°\text{C.}]/(T-25°\text{C.})*10^6, \text{ where } -55°\text{C.} \leq T \leq +125°\text{C.}$$

The resistivity was measured in Ωcm unit at 25° C., after applying a rated voltage of 50V for 60 seconds. The results for each specimen are shown in table 3 below.

TABLE 3

| Specimen | Sintering Temp. (° C.) | Dielectric Constant | Tanδ (%) | TCC (ppm/° C.) 125° C. | TCC (ppm/° C.) −55° C. | Characteristic | Resistivity (Ω cm) | Grain size (μm) |
|---|---|---|---|---|---|---|---|---|
| Exam. 1 | 1,200 | 58.36 | 0.03 | −671 | −778 | UJ | >E15 | 1.4 |
| Exam. 2 | 1,200 | 60.4 | 0.04 | −670 | −830 | UJ | >E15 | 1.4 |
| Exam. 3 | 1,200 | 61.05 | 0.03 | −730 | −840 | UJ | >E15 | 1.4 |
| Exam. 4 | 1,200 | 62.14 | 0.03 | −630 | −710 | UJ | >E15 | 1.3 |
| Exam. 5 | 1,200 | 38.4 | 0.04 | −147 | −180 | PH | >E15 | 1.5 |
| Exam. 6 | 1,250 | 42.15 | 0.04 | −227 | −253 | RH | >E15 | 1.5 |
| Exam. 7 | 1,230 | 53.82 | 0.04 | −456 | −508 | TH | >E15 | 1.4 |
| Exam. 8 | 1,250 | 61.32 | 0.07 | −728 | −856 | UJ | >E15 | 1.6 |
| Exam. 9 | 1,230 | 37.1 | 0.04 | −207 | −280 | RH | >E15 | 1.6 |
| Exam. 10 | 1,250 | 47.5 | 0.05 | −405 | −520 | TH | >E15 | 1.5 |
| Exam. 11 | 1,250 | 60.45 | 0.05 | −706 | −850 | UJ | >E15 | 1.5 |
| Comp. Exam. 1 | 1,300 | 30.14 | 0.05 | 134 | 162 | — | >E15 | 2.5 |
| Comp. Exam. 2 | 1,200 | 198 | 0.09 | −2200 | −3300 | — | >E15 | 2.5 |
| Comp. Exam. 3 | 1,230 | 35.81 | 0.04 | −33.6 | −85.3 | — | >E15 | 1.4 |
| Comp. Exam. 4 | 1250 | 156 | 0.05 | −1400 | −1800 | — | >E15 | 1.3 |

As can be seen from the above table 3, examples of the present invention had a small dielectric loss(tan δ) and a high resistivity, could be sintered under a reducing atmosphere to be used in formation of a nickel electrode and could be sintered at low temperature of less than 1,250° C. In particular, the examples of the present invention provided a dielectric composition meeting TC characteristics in accordance with the EIA Standard.

On the other hand, comparative examples (1–4) out of the composition range of the present invention had excessively been sintered at too high temperature or did not meet TC characteristics(PH, RH, TH and UJ characteristics).

As apparent from the above description, the present invention provides a composition capable of being sintered at low temperature of less than 1,250° C., as well as being sintered under a reducing atmosphere to be used in formation of a nickel electrode. As a result, mismatching between a nickel electrode and ceramic during the sintering process can be prevented. Further, the dielectric composition can provide a TC based electric composition having a small dielectric loss and a high resistivity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A nonreducible dielectric composition comprising a main component expressed by the general formula, $(Ca_{1-x}Sr_x)_m(Zr_{1-y}Ti_y)O_3$, which has the ranges of $0 \leq x \leq 1$, $0.09 \leq y \leq 0.35$ and $0.7 \leq m \leq 1.05$; and 0.5–10 wt. % of a minor component expressed by the general formula, [aMnO-bSiO$_2$-dRlO-eR2O$_2$ (a+b+d+e+=100, R1 is at least one element selected from the group consisting of Mg, Ca, Sr and Ba, and R2 is at least one element of Zr and Ti), which has the ranges of $20 \leq a \leq 60$, $10 \leq b \leq 65$ and $0 < (d+e) \leq 65$] aMnO-bSiO$_2$-eZrO$_2$ (a+b+e+=100). which has the ranges of $20 \leq a \leq 60$, $10 \leq b \leq 65$ and $0 < e < 65$.

2. A multi-layered ceramic capacitor comprising:

a plurality of sheets of dielectric composition according to claim 1; and a plurality of electrodes on each of sheets, wherein the sheets and the electrodes are alternatively laminated.

* * * * *